（12）United States Patent
Hornschuch et al.

(10) Patent No.: US 12,370,507 B2
(45) Date of Patent: Jul. 29, 2025

(54) MIXING DEVICE AND MOLDING MACHINE

(71) Applicant: Krüger und Salecker Maschinenbau Gmbh & Co. KG, Bad Schwartau (DE)

(72) Inventors: Stephan Hornschuch, Mönchengladbach (DE); Kay Rose, Stockelsdorf (DE); Tim Drzewiecki, Ratekau (DE)

(73) Assignee: KRÜGER UND SALECKER MASCHINENBAU GMBH & CO. KG, Bad Schwartau (DE)

( * ) Notice: Subject to any disclaimer, the term of this patent is extended or adjusted under 35 U.S.C. 154(b) by 47 days.

(21) Appl. No.: 18/389,927

(22) Filed: Dec. 20, 2023

(65) Prior Publication Data

US 2024/0207797 A1 Jun. 27, 2024

(30) Foreign Application Priority Data

Dec. 23, 2022 (EP) .................................... 22216508
May 4, 2023 (EP) .................................... 23171499

(51) Int. Cl.
*B01F 23/45* (2022.01)
*B01F 25/64* (2022.01)
*B01F 35/221* (2022.01)
*B01F 25/00* (2022.01)

(52) U.S. Cl.
CPC .......... *B01F 23/452* (2022.01); *B01F 25/643* (2022.01); *B01F 35/2212* (2022.01); *B01F 35/2215* (2022.01); *B01F 2025/911* (2022.01); *B01F 2025/9191* (2022.01); *B01F 2215/0495* (2013.01)

(58) Field of Classification Search
CPC B01F 23/452; B01F 35/2215; B01F 35/2212; B01F 25/643
See application file for complete search history.

(56) References Cited

U.S. PATENT DOCUMENTS

| 2,915,993 | A | 12/1959 | Wilcox | |
|---|---|---|---|---|
| 2015/0092513 | A1* | 4/2015 | Folkner | ............. B01F 25/45212 366/340 |
| 2024/0269627 | A1* | 8/2024 | Taniguchi | ............. B01F 25/742 |

FOREIGN PATENT DOCUMENTS

| CN | 114009571 A | 2/2002 |
|---|---|---|
| EP | 1064851 A1 | 1/2001 |
| EP | 1247454 A1 | 10/2002 |
| WO | 0226048 A2 | 4/2002 |
| WO | 2014190217 A1 | 11/2014 |
| WO | 2017121822 A1 | 7/2017 |

* cited by examiner

*Primary Examiner* — P. Macade Nichols
(74) *Attorney, Agent, or Firm* — McGlew and Tuttle, P.C.

(57) ABSTRACT

A mixing device is configured for the continuous provision of a gelling mass for a molding machine. The mixing device includes an inlet, an outlet and a conduit section which is situated between the inlet and the outlet and into which at least one admixing conduit runs out, via which admixing conduit a substance to be admixed can be fed such that the substance to be admixed is mixed with a base mass which is fed through the inlet, in a mixing region in the conduit section. The mixing device is configured in a manner such that the spatial distance between the outlet and the mixing region in which the substance to be admixed is mixed with the base mass, can be changed. A molding machine with such a mixing device and to a method for processing a flowable and gellable mass are provided.

18 Claims, 3 Drawing Sheets

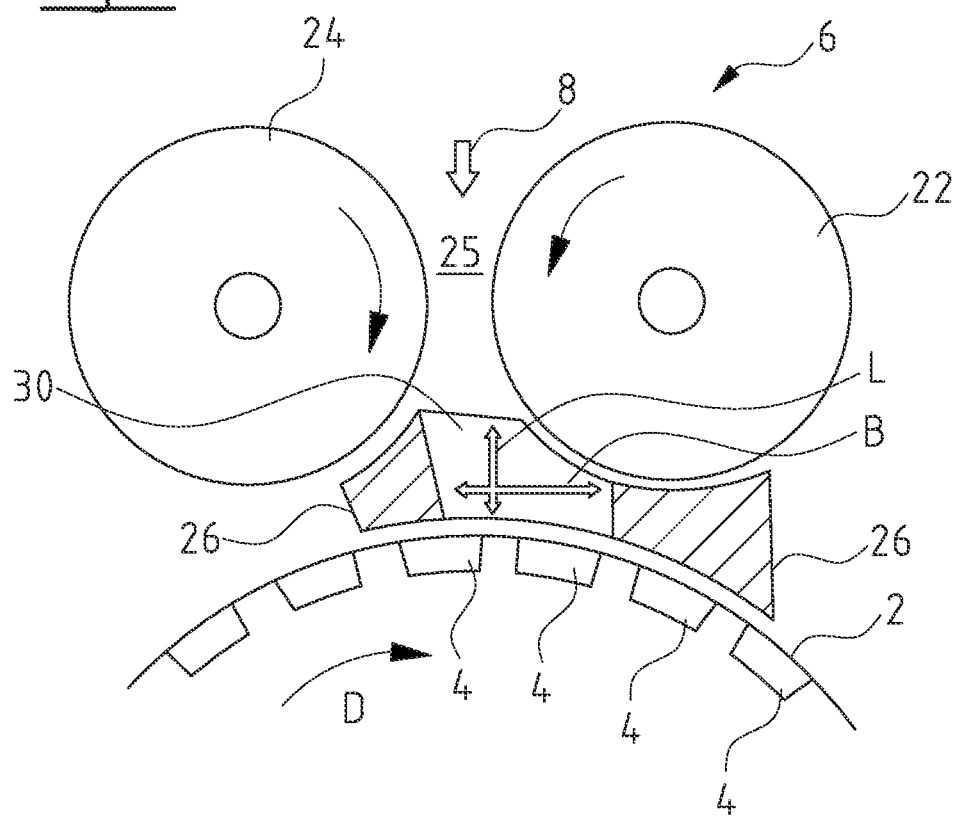

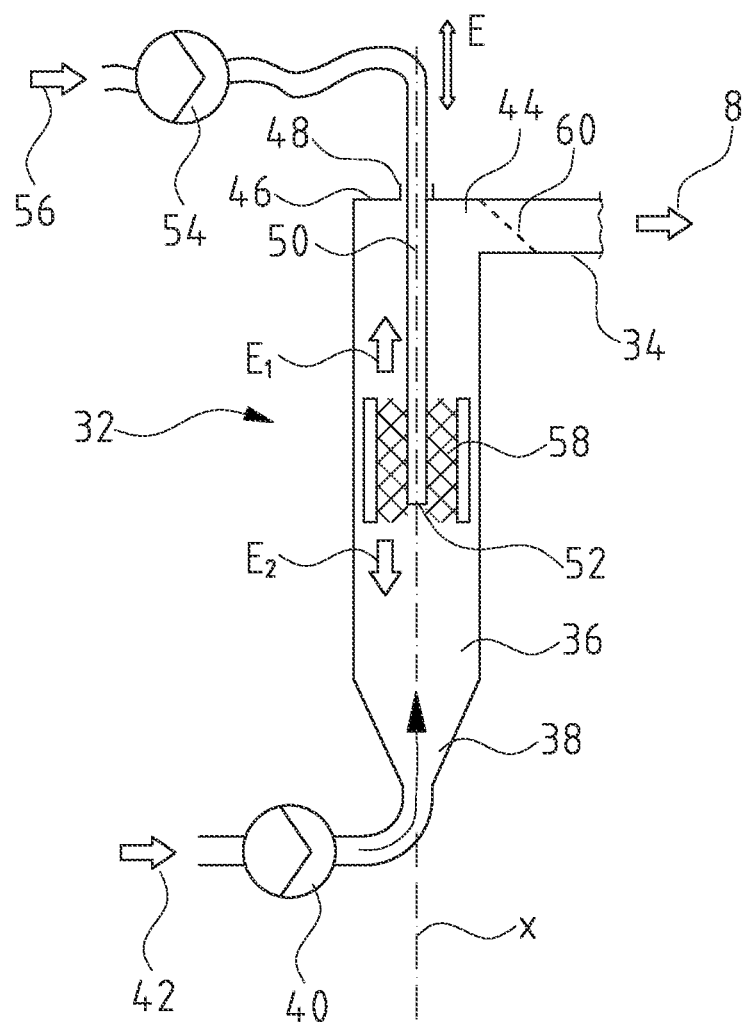

MIXING DEVICE AND MOLDING MACHINE

CROSS REFERENCE TO RELATED APPLICATIONS

This application claims the benefit of priority under 35 U.S.C. § 119 of European Application 22216508.6, filed Dec. 23, 2022 and European Application 23171499.9, filed May 4, 2023, the entire contents of which are incorporated herein by reference.

TECHNICAL FIELD

The invention relates to a mixing device configured for the continuous provision of a gelling mass for a molding machine as well as to a method for processing a flowable and gellable mass.

BACKGROUND

The most varied of products, in particular foodstuffs are molded from hardening or gelling masses. Such products could be for example fruit gums.

Until now, fruit gums have been manufactured e.g. in a manner such that negative shapes of the product are pressed into a starch bed and are subsequently filled with the heated fruit gum mass. For hardening, the molds need to cool over several hours, so that the products can gel to such an extent that they can be removed from the mold, wherein the mold is destroyed and the starch flour can possibly be reused for manufacturing new molds. This process is very extensive and time-intensive and requires much space for storing the molds during the hardening of the products.

In order to permit a continuous molding and processing of a gelling mass in a molding machine, it is essential for the mass to gel in the molding machine in a very precisely controlled manner with regard to time.

SUMMARY

It is an object of the invention to provide a mixing device for the continuous provision of a gelling mass for a molding machine as well as a method for processing a flowable and gellable mass, which permit the ensuring of the gelling in the molding machine at the correct point in time.

This object is achieved by a mixing device with features which are specified herein, by a molding machine with features specified herein as well as by a method with features specified herein. Preferred embodiments result from the description as well as the attached figures.

The mixing device according to the invention is configured to provide a gelling or gellable mass for a molding machine in a continuous process. Herein, it is the task of the mixing device to admix a substance to the base mass, said substance preferably starting or activating the gelling procedure. In the process, the mixing device is herewith preferably arranged subsequent to a further processing device, possibly to a further mixing device, which provides the base mass. The base mass for example can be a sugar-containing mass for manufacturing fruit gums. The mixing device comprises an inlet, an outlet and a conduit section which is situated between the inlet and outlet. The provided base mass enters into the inlet, flows through the conduit section and exits again out of the outlet. The conduit section can be configured in an enlarged manner with respect to the connecting conduit sections, in order to form a buffer space or buffer volume in the feed for the mass. In order to effect the flow of the mass through the conduit section, a conveying device such as a pump can be situated in the flow path for the mass, for example downstream of the inlet and/or upstream of the outlet. An admixing conduit, via which a substance to be admixed can be fed, runs out in the conduit section. The admixing conduit can be connected for example to a metering pump, via which the substance is fed to the admixing conduit and is metered. The substance to be admixed can be fed via the admixing conduit in a manner such that the substance is mixed with the base mass which flows through the conduit section, in a mixing region in the conduit section. A continuous admixing process in the conduit section is therefore made possible.

According to the invention, the mixing device is configured in a manner such that the spatial distance between the outlet of the conduit section and the mixing region, in which the substance to be admixed is mixed with the base mass, can be changed. By way of this, the conveying path through which the mixed mass flows from the mixing region to the outlet changes. This permits the dwell duration in the conduit section downstream of the mixing region to be changed or adapted. For example, if the dwell duration is to be kept constant but the flow speed changes, for example due to the removal quantity of the mass downstream of the outlet being changed, it is possible to adapt the distance between the mixing region and the outlet such that the dwell duration remains essentially constant. This means that on increasing the flow speed, the distance is increased and on reducing the flow speed the distance is shortened. Such an adaption can be necessary for example if the molds in the molding machine are changed. If smaller products are molded, less mass is required and the removal quantity and herewith the flow speed in the feed reduces. With larger molds, a greater mass must be fed, which is why the flow speed is increased.

With the configuration according to the invention, not only is it possible to keep the dwell duration in the feed for the gelling mass essentially constant given changing flows speeds, but it is further possible to adapt the dwell duration to different products or masses, for example depending on the gelling time, which is the time duration which passes from admixing the substance until gelling. Hence it is possible to adapt the facility to different recipes for different products. The adaptability allows the dwell duration in the mass feed to the molding machine to be set such that a hardening or gelling is effected in the molding machine at precisely the right point in time, so that the mass can be fed to the molding machine in the flowable state, but then a sufficiently hardened or gelled product can be removed from the molding machine after a predefined time. It is thus ensured that the gelling process begins or takes place in the mold at the optimal point in time. If a pectin-containing sugar mass is used as a base mass, for example an acid can be admixed as a substance for activating the gelling procedure. For this case, it is advantageous if the admixing conduit is connected to an acid feed or acid metering device.

According to a first possible embodiment of the invention, the at least one admixing conduit comprises several run-out openings which are distanced to the outlet to a different extent and comprise individual shut-off devices. The shut-off devices can be shut-off devices which are to be actuated manually or also controllable shut-off devices, for example electrically or pneumatically activated shut-off devices. The run-out openings can be selectively opened or closed by the shut-off devices. The distance of the mixing region to the outlet can be changed depending on which of the several run-out openings is opened. If a run-out opening which is situated close to the outlet is opened and the other run-out openings are closed, then the distance is shortened. Conversely, the distance can be shortened by way of opening a run-out opening which is situated more remotely from the outlet and closing run-out openings which are situated closer to the outlet.

According to a further possible embodiment of the invention, the at least one admixing conduit comprises at least one run-out opening whose position relative to the outlet is changeable. With regard to this embodiment, for example a component which comprises the run-out openings can be changeable in its position relative to the outlet, for example arranged in a displaceable or adjustable manner.

According to a further possible embodiment of the invention, the at least one admixing conduit which comprises at least one run-out opening is connected to a setting device, via which the distance between the at least one run-out opening and the outlet can be changed. This setting device can be configured such that the distance of the run-out opening can be changed from outside the conduit section. This means that the conduit section does not need to be opened for setting. The setting device can be manually actuatable, but in a particular embodiment can also comprise a servo drive, for example an electrically or pneumatically actuated servo drive. This permits the setting of the setting device for example via a facility control, in order to permit an automated adaption, for example given a change in recipe or mold.

In a particular embodiment, several admixing conduits can also be present in a suitable design, for example in order to be able to admix different substances. Herein, the mixing regions for the different substances can be changed in their distance to the outlet either commonly or also independently of one another, wherein this is preferably made possible in the aforedescribed manner.

The mixing device in a conduit section preferably comprises a stationary mixer, in which the at least one admixing conduit runs out. The position of the stationary mixer relative to the outlet is preferably changeable, particularly preferable changeable together with a run-out opening of the admixing conduit. The admixing conduit preferably runs out at the upstream end of the stationary mixer, so that the admixed substance together with the base mass enters into the stationary mixer and a mixing of the substance and base mass takes place on flowing through the stationary mixer. The stationary mixer can be formed for example by way of stationary blades, guide elements or the like. Alternatively or additionally, a moved mixer can be arranged in the conduit section, in order to mix the substance and the base mass.

The admixing conduit according to a possible embodiment of the invention is configured as an admixing pipe which extends through a recess in a wall of the conduit section and is axially displaceable in the recess in the direction of its longitudinal axis. The leading of the admixing pipe in the recess is herein preferably configured in sealed manner such that no mass can exit outwards out of the inside of the conduit section. The run-out opening of the admixing conduit is preferably formed in the admixing pipe or arranged on the admixing pipe. For example, the admixing pipe can be configured open at the end, so that the open end forms the run-out opening. The position of the run-out opening in the conduit section can herewith be changed by way of the axial displacement of the admixing pipe. Herein, the longitudinal axis of the admixing pipe further preferably extends in the direction of the flow direction which is defined by the inlet and the outlet, which is to say the flow direction of the mass through the conduit section. In this manner, the run-out opening can be changed in its position relative to the outlet when the admixing pipe is displaced in the recess, so that its extends into the conduit section to a different extent.

The inlet preferably lies at a first end of the conduit section, whereas the outlet is situated close to an opposite second end of the conduit section. An admixing pipe preferably extends through a wall of the conduit section which is situated at one of the axial ends at the face side, preferably through a wall which is situated at that end of the conduit section, at which the outlet is located. The conduit section can be configured for example in a tubular manner and at one end be closed by a wall at the face side. At this end, the outlet can extend out of the conduit section in the radial direction, so that it is possible to incorporate the recess for the arrangement of the admixing pipe in the wall which closes the face side.

The mixing device further preferably comprises at least one delivery pump upstream of the inlet, for conveying the base mass. This delivery pump can be configured as a metering pump in order to ensure a defined feed flow and through-flow of the base mass in the conduit section.

Apart from the previously described mixing device, the subject-matter of the invention is a molding machine for manufacturing shape-stable products from a moldable and gellable mass, wherein the molding machine comprises a mixing device as has been described and which is configured to provide the moldable mass and feed it to a molding device. The mixing region which can be differently positioned in the mixing device herein permits the time duration which the mass to be molded requires from the mixing region to into the mold, to be adapted or set.

The molding machine preferably comprises a rotatingly driven molding roller, in whose lateral surface mold cavities are formed. The outlet of the existing mixing device is preferably connected to a filling device of the molding roller, in particular to a filling region between a filling roller and the molding roller, so that the mass which is mixed in the mixing device is fed to the molding roller and is then molded out in the molding cavities of the molding roller. Herein, the time duration for the feed of the mixed manner is set such that the gelling preferably takes place not until in the mold cavities. The mass is thus kept flowable up to the entry into the mold cavities and then hardens in the mold cavities at least at the surface, to such an extent that the products are shape-stable and can be removed from the mold cavities.

The molding machine is further preferably or alternatively configured and envisaged for manufacturing products from a mass with a viscosity in the range of 10000 to 80000 mPas. Such a molding machine can also be configured without the previously described mixing device, i.e. the mass can be provided in another manner, possibly without the later admixing of a further substance. Concerning the mass with a viscosity in the range of 10000 to 80000 mPas, it is the case of a mass which has the mentioned viscosity before the molding and then solidifies, for example due to gelling or cooling and by way of this assumes an essentially shape-stable state. Such products can be e.g. foodstuffs or foodstuffs with active or functional additives or also other flowable substances with a corresponding viscosity which for example solidify by way of an activator or cooling. Thus the mass can e.g. be a fruit gum mass, so that the molding machine is configured for the production of fruit gums. Such a mass however can also be a different mass for the manufacture of sweets or also foodstuffs which are not sweet. Furthermore, other products for which a mass which is provided in the mentioned viscosity range must harden in a mold can also be manufactured with the molding machine. Particularly preferably, the mass is a mass comprising a gelling means, wherein the mass gels e.g. on cooling and/or after a certain time and at the end assumes an elastic or gel-like structure.

The molding machine preferably comprises a rotatingly driven molding roller, in whose lateral surface or surface mold cavities or mold recesses are formed, wherein these have the negative shape of the product to be molded. The molding roller can be manufactured of metal, e.g. of aluminum, or plastic. The roller rotates about its longitudinal axis. Herein, the molding roller is preferably driven in a continuously rotating manner, so that a continuous molding process is realized with the molding machine. The mold cavities are filled with the mass which has a viscosity in the range of 10000 mPas to 80000 mPas, during the continuous rotation and the products which have become solidified are removed from the mold cavities again at another position. The solidification of the mass is effected in the mold cavities during the rotation of the roller.

The molding machine in a further possible embodiment comprises at least one filling roller which is arranged distanced to the molding roller, is likewise driven in a rotating manner and is preferably heated. The rotation axis of the filling roller extends parallel to a rotation axis of the molding roller. The molding roller and the at least one filling roller can be driven via a common drive, but also with separate drives, in particular electrical drive motors. The molding roller and the filling roller are preferably driven such that their lateral surfaces or surfaces move at essentially the same speed. This means that given different diameters, the rollers are preferably driven differently rapidly. The molding roller is preferably larger in diameter than the filling roller, so that the filling roller is driven at a higher rotation speed. At least one spacer element which closes the gap or free space between the filling roller and the molding roller is arranged between the at least one filling roller and the molding roller. The spacer element is therefore in contact with the lateral surface of the filling roller and with the lateral surface of the molding roller. The filling roller can therefore feed the mass to the molding roller and press it into the mold cavities on the lateral surface of the molding roller. The spacer element in its length between the filling roller and the molding roller is configured in such a short manner that an undesirable solidification of the mass does not occur in the region of the spacer element before this mass reaches the mold cavities. As the case may be, the spacer element can also be heated, in order to prevent solidification or rigidifying of the mass before the entry into the mold cavities. This means that by way of the filling roller and possibly the spacer element, the mass can be controlled in temperature during the feed, so that the viscosity is kept in the mentioned range, this permitting the mass to flow or be spread into the mold cavities. Due to the fact that the spacer element slides on the lateral surface of the molding roller, the mass is spread away from the lateral surface regions next to the mold cavities, so that when the lateral surface of the molding roller has passed the spacer element, it is only the mass which remains in the mold cavities and can harden there.

The molding machine further preferably comprises a removal belt which encompasses the molding roller in a peripheral region and extends away from the molding roller in the removal region. The products which lie in the mold cavities come into contact with the removal belt and are removed from or pulled out of the mold cavities and transported away from the molding roller via the removal belt which extends away from the molding roller in the tangential direction. The removal belt is moved together with the molding roller in the encompassing peripheral region. The products can come into contact with the removal belt in this peripheral region. The products are then removed from the mold cavities at the location at which the removal belt extends away from the molding roller in the tangential direction. Preferably, the removal belt extends away from the molding roller essentially in the horizontal direction at the lower side of the molding roller. The filling roller is preferably arranged on the upper side of the molding roller, so that the mass is fed to the molding roller at the upper side, wherein the feed of the mass is assisted by gravity. The mass remains in the mold cavities during the rotation of the molding roller from the upper side to the lower side and during this movement can harden in the mold cavities to such an extent that the product is shape-stable to the extent that it can be removed from the mold cavity.

This molding machine has the advantage that fruit gums and similar products can be manufactured in a continuous process and that no hardening in the mold over several hours is necessary. The feed of a heated and temperature-controlled mass and/or one which is mixed in the described manner, to the molding roller permits the feeding of the mass with a viscosity in the aforementioned viscosity range, so that it has an adequate flowability, in order to fill the mold cavities, but subsequently hardens or solidifies in such a rapid manner that the product can be removed from the mold cavities after a short time. In particular, this can be made possible by adapting the point in time of gelling with the aforedescribed mixing device.

The molding roller and the filling roller are preferably connected to at least one rotation drive in a manner such that the molding roller and the at least one filling roller are driven in opposite rotation directions. The mass is thus moved from the filling roller to the molding roller and by way of the opposite movement is pressed into the gap between the molding roller and filling roller.

The removal belt is preferably driven in a manner such that the belt surface moves with the lateral surface or surface of the molding roller, which is to say at the same speed as the lateral surface of the molding roller, in the peripheral region which encompasses the molding roller. The removal belt preferably comprises a separate drive or is coupled to the drive of the molding roller via suitable gear means, so that it moves at a suitable speed. Alternatively, it can be driven directly by the molding roller. The removal belt is configured as a loop which is deflected via suitable rollers or rolls. The surface of the removal belt moves in a direction away from the molding roller, so that the removed products are moved away from the molding roller. At its end, the removal belt can possibly transfer the products to further conveying devices or they can be removed by hand.

According to a further embodiment of the invention, the molding machine comprises a heated product feed device which is configured to temperature control the mass to be molded in a defined manner, preferably to a temperature ≤90° C., wherein the mass has a viscosity in the range of 10000 to 80000 mPas. Such a viscosity ensures the molding ability in the mold cavities, but given a mass which hardens due to cooling permits a rapid surface solidification in the mold cavities. The product feed device can be an external cooker and/or mixer in particular a mixing device as has been described previously. The product feed device is further preferably configured such that the mass which is temperature-controlled and/or set in its viscosity in such a way is fed to the filling roller or into the space between the filling roller and the molding roller. This is preferably effected continuously. In an alternative embodiment, a buffer volume can be formed in front of the filling roller, in which buffer volume such a volume of the mass is always kept such that the production or the molding by the molding roller can continue to run in a continuous manner even if the mass is fed from the product feed device in a discontinuous or change-wise manner. The temperature control of ≤90° C. ensures a rapid hardening of the mass in the mold cavities of the molding roller.

The removal belt is preferably cooled in at least one section which is situated in the part which extends away from the molding roller. The further hardening or solidification of the products taken from the molding roller is accelerated by the cooling of the removal belt, so that these products can then be removed from the removal belt without any problem and processed further, for example packaged. The removal belt is preferably cooled to a temperature ≤20° C. and further preferably ≤10° C. The removal belt can extend through a cooling tunnel for cooling, so that not only is the belt cooled, but also the products which are arranged on the belt when they pass the cooling tunnel. Alternatively or additionally, a cooling device can be arranged below the removal belt. For example, the removal belt can be led over a cooled surface, so that the removal belt and the products which are arranged thereon are cooled from below.

The mold cavity and the removal belt are preferably configured such that an adhesive force or the adhesion between the removal belt and the product which is molded from the mass is larger than an adhesive force or adhesion between the mold cavity and the product which is molded from the mass. By way of this, one succeeds in the product sticking to the removal belt when the removal belt runs along the lateral surface of the molding roller in the wrap region. In the region in which the removal belt is then led tangentially by the lateral surface of the molding roller, the removal belt pulls the product out of the mold cavities due to the adhesion force between the removal belt and the product. The material and the structure of the removal belt are therefore preferably adapted to the product such that a desired adhesion between the product and the removal belt is achieved. An adhesive agent can be deposited onto the removal belt as the case may be, in order to improve the adhesion of the products. Alternatively or additionally, the mold cavities can also be coated with a release agent before the filling of the mass, in order to reduce the adhesive force between the product and the surface of the mold cavity. Moreover, the mold cavities are preferably configured such that no undercuts render the release of the product more difficult, i.e. preferably no positive fit arises between the product and the mold cavity.

According to a further preferred embodiment of the invention, the mold cavities each comprise a closed surface which further preferably is free of mold-removal means. This means that according to this embodiment, no mold removal means such as for example air nozzles or moving stamps which push the product out of the mold cavities are provided. The product is preferably pulled out of the mold cavity solely by way of the removal belt. Hence no further mechanics for the removal of the product from the mold cavity are necessary. This assists in the cleaning ability of the mold cavities and improves the surface of the products. Moreover, this permits a simple construction of the molding roller since no air feeds or movable elements are necessary in the inside of the molding roller.

According to a further possible embodiment of the invention, the molding machine comprises two rotatingly driven filling rollers which are arranged distanced to one another. Both filling rollers are preferably heated and preferably arranged above the molding roller. A free space which serves for receiving the mass to be molded and into which the mass is fed for example from a mixing device, as has been described above, is therefore formed between the two filling rollers. A spacer element as been described above and which is in contact with the lateral surface of one of the filling rollers and with the lateral surface of the molding roller is arranged between each of the filling rollers and the molding roller. Hence on the one hand the free space between the filling roller and the lateral surface of the molding roller is closed, and on the other hand a distance is created between the filling roller and the molding roller, said distance ensuring that adequate mass is kept ready in this region, in order to completely fill the mold cavities. Furthermore, a receiving space for the mass above the molding roller in this region permits further product constituents of the mass to be admixed, for example solid constituents which are to be embedded in the inside of the mass. These for example could be pieces of fruit.

The filling rollers are preferably driven together with the molding roller via a common drive, but can also comprise separate drives which are then preferably synchronized with the drive of the molding roller, so that the filling rollers rotate at a speed at which the surface speed corresponds essentially to the surface speed of the molding roller. The two rollers preferably rotate in opposite directions, so that one of the filling rollers rotates oppositely to the molding roller and the other filling roller in the same direction as the molding roller. Herein, it is preferably that filling roller which is situated further to the rear in the rotation direction of the molding roller which rotates in the same rotation direction as the molding roller.

The removal region, in which the removal belt extends away from the molding roller essentially in the tangential direction, is preferably distanced in the circumferential direction of the molding roller in an angle of at least 90°, further preferably larger than 150° and particularly preferably of essentially 180 degrees, from a filling region, which is to say the region in which the filling roller is arranged. By way of this, one succeeds in the products remaining in the mold cavities over a rotation angle of more than 90° or more than 150°, preferably essentially 180° and being able to become solid there in the time duration of this movement. The molding roller preferably moves at a surface speed between 0.5 and 5 meters per minute. Herein, the speed can be adapted to the hardening time of the products, so that it is ensured that at least the surfaces of the products are cured to such an extent that the products can be removed from the mold cavities.

Apart from the previously described mixing device and the described molding machine, the subject-matter of the invention is a method for processing a flowable and gellable mass. This method in particular comprises a shaping of the gellable mass. According to this method, a substance which activates a gelling process is continuously admixed to a base mass which flows in the feed conduit. This mixed mass is then processed further, which is to say is molded or filled into molds in a suitable manner as the case may be.

According to the invention, the mentioned substance is admixed to the base mass in at least one mixing region which is situated in the feed conduit. The dwell duration of the base mass with the admixed substance downstream of the mixing region, according to the invention is set by way of changing the position of the mixing region. This means that preferably the path to be covered from the mixing region up to the shaping of the mass, in particular to the filling in a mold can be lengthened or shorted, in order to adapt the dwell duration. Herein, on the one hand the path can be adapted such that the dwell duration remains essentially constant at different flow speeds. But alternatively, it is also possible to change the dwell duration, for example to be able to adapt it to different gelling time durations of different products. The above description of the mixing device is referred to inasmuch as this is concerned. It is to be understood that preferred features of the mixing device which are described above likewise represent preferred features of the method.

The base mass which is mixed with the substance is preferably molded in a mold and after at least partially effected gelling is removed from the mold. The adaption of the dwell time herein permits the setting of the point in time of gelling such that the viscosity permits an adequate flowability for filling into the mold, but the product gels in the mold such that it can be removed from the mold in a shape-stable manner after a predefined time interval. For this, the time interval between the admixing of the substance to the base mass and bringing the mass into the at least one mold can be set by a change of the distance of the mixing region from the mold, said distance being given by the flow direction. In this manner, the facility can be set such that the shape-stable solidification of the mass preferably does not set in until in the mold.

The base mass preferably comprises a gelling agent, for example pectin and the admixed substance preferably comprises an activator, particularly preferably an acid. On using pectins, as a rule the gelling does not set in until an acid is admixed. This permits the base mass, for example a fruit gum mixture to be firstly kept in a flowable state over a longer period of time, to then be fed to a mixing device in which the activator, preferably the acid is admixed, and to subsequently be brought into a mold in a targeted manner, so that so that the shape-stable solidification sets in in the mold.

Further preferably or alternatively, the method is a method for manufacturing shape-stable products from a mass with a viscosity in the range of 10000 to 80000 mPas. This method can be carried out with or without the described admixing of a substance which activates the gelling process. The method is preferably carried out amid the use of a molding machine as has been described above. Preferred embodiments of the molding machine which have been described previously are also to be seen as preferred method features. Accordingly, subsequently described preferred method features are also to be understood as preferred embodiment features of the molding machine.

According to the method according to the invention, a flowable and preferably heated mass, from which the products are to be molded, is provided with a viscosity in the range of 10000 to 80000 mPas. In a special method variant, the mass is further heated and temperature-controlled. At this viscosity, the mass is adequately flowable, in order to mold out the products by way of filling the mass in mold cavities, but can harden to such a rapid extent that the surface of the mass solidifies, so that the product can be removed from the mold cavities. The provided flowable mass, possibly in the heated state, is preferably brought into mold recesses of a rotating molding roller. This is preferably effected at the upper side of the molding roller, so that the flowable mass can be cast or spread into the mold cavities. During the rotation of the molding roller, the mass solidifies in the mold cavities in a manner such that the product can thereafter be removed from the mold cavities. Herein, the mass does not need to harden completely, but it is sufficient for the surface of the mass to solidify such that the product is shape-stable and can be removed from the mold cavity. The solidification can be effected for example by way of cooling and/or gelling.

Preferably, the flowable mass is filed into the mold cavities in a filling region. This filling region is preferably situated on the upper side of the molding roller. The molded products are removed from the mold cavities in a removal region. The removal region is herein distanced to the filling region in the circumferential direction of the molding roller preferably in an angle of at least 90°, further preferably in an angle ≥150° ideally in an angle of essentially 180°. In this manner, one succeeds in the removal being effected in the region of the lower side of the molding roller. The removal can therefore be assisted by gravity. Moreover, the products which are removed from the mold cavities can come to lie on a removal belt in a direct manner and be conveyed away by way of the movement of the removal belt in the horizontal direction. As described above by way of the molding machine, the removal belt bears on the molding roller preferably in a peripheral region, so that an adhesion of the products on the removal belt can occur.

Preferably, the products are pulled out of the mold cavities from the outside by way of a removal element which adheres to the products, i.e. the mentioned removal belt, without further mechanics for mold removal.

According to a further embodiment of the method, the flowable mass is brought into the mold cavities in heated manner. The heated flowable mass preferably has a temperature ≤90° C. on filling into the mold cavities. A low as possible filling temperature encourages the rapid hardening or solidification in the mold cavities. On removal from the mold cavities, the products preferably have a temperature ≤50° C., wherein the temperatures and the mass are matched to one another such that on removal from the mold cavities the product has an adequate strength in order to be intrinsically stable. Particularly preferably, a cooling of roughly 40° C. between the filling and the removal is effected. This cooling process can be effected by way of convection and/or additional cooling, for example cooling of the molding roller. The products can be cooled further after the removal.

The invention is explained hereinafter by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a detail enlargement of FIG. 1; and

FIG. 4 is a schematic view showing a mixing device for providing the mass to be molded.

DESCRIPTION OF PREFERRED EMBODIMENTS

Figure 1:
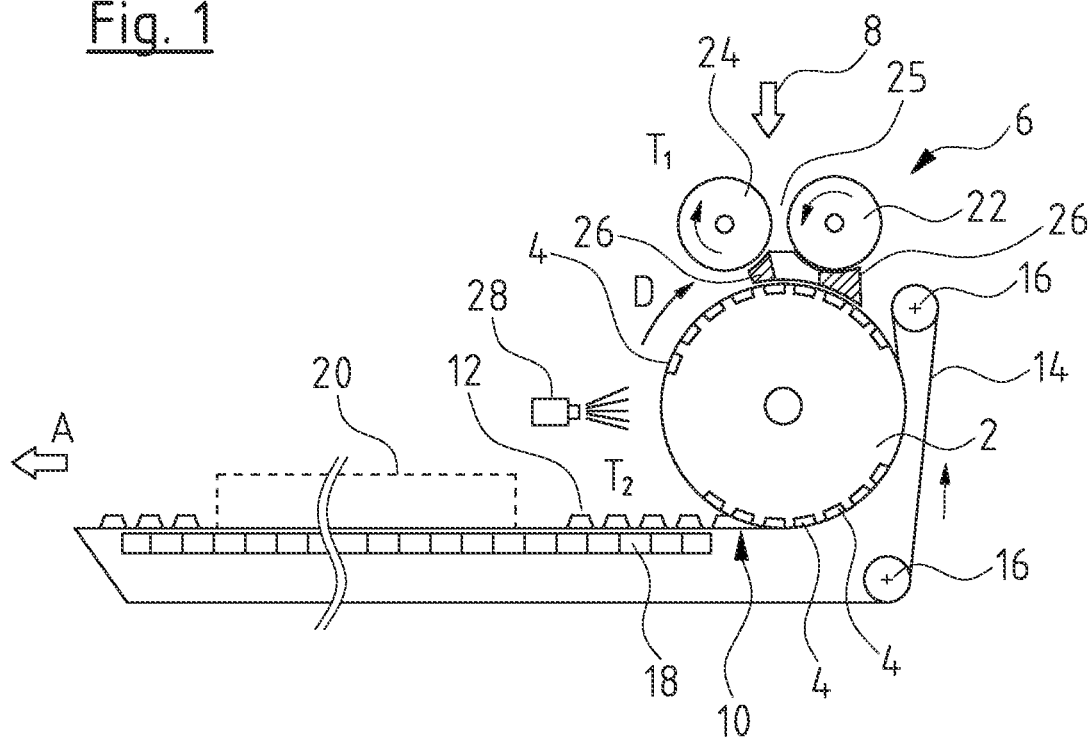
FIG. 1 is a schematic sectioned view of a molding machine according to a first embodiment.
Figure 2:
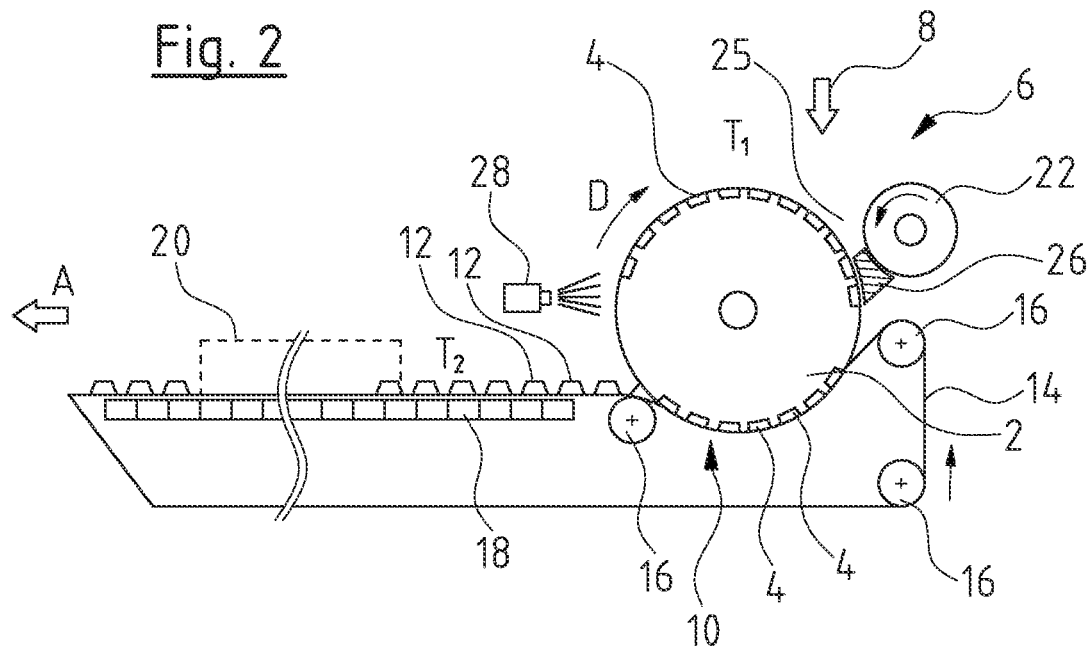
FIG. 2 is a schematic sectioned view of a molding machine according to a second embodiment.

Referring to the drawings, the molding machine in both embodiment examples according to FIGS. 1 and 2 comprises a molding roller 2 which is rotatingly driven in a manner such that it rotates in the rotation direction D. Mold cavities 4 which form the negative shapes for the products to be molded are incorporated into the lateral surface or surface of the molding roller in a manner distributed over the periphery of the molding roller 2. With both embodiment examples, a filling region 6 is situated above the molding roller 2, in which filling region the mass 8 to be molded is brought into the mold cavities 4 of the molding roller 2. A removal region 10, in which the finished molded products 12 are removed from the mold cavities 4 is situated at the lower side of the molding roller 2.

In both embodiment examples, it is solely a removal belt 14 which serves for removing the products 12 out of the mold cavities 4, and this belt is led via rollers 16 such that in a peripheral region it encompasses the molding roller 2 and in this region moves together with the molding roller 2 such that the removal belt 14 and the lateral surface of the molding roller 2 move at the same speed. In these embodiment examples, the removal belt 14 encompasses the molding roller 2 at an angle of essentially 90° between the filling region 6 and the removal region 10. In this wrap region, the removal belt 14 comes into contact with the products 12 in the mold cavities 4 and the products 12 adhere to the surface of the removal belt 14. In the removal region 10 in which the removal belt 14 extends away from the molding roller 2 in an essentially tangential direction, the products 12 are moved or pulled out of the mold cavities 4 and are transported away on the removal belt 14 in the direction of the arrow A. The mold removal is herewith effected without further mold removal means or mechanics, solely by way of pulling the products 12 out of the mold cavities 4 by way of the removal belt 14. A cooling device 18 can be arranged below the removal belt 14 in the region which connects to the removal region 10. Alternatively or additionally, the removal belt 14 can run through a cooling tunnel 20 so that the molded products 12 are conveyed through the cooling tunnel 20. The products 12 are cooled via the cooling device 18 and/or the cooling tunnel 20 so that they can harden further.

In the first embodiment example according to FIG. 1, two filling rollers 22, 24 are provided for the feed of the mass to be molded in a viscous or fluid state in a viscosity range between 10000 and 80000 mPas. The filling rollers 22, 24 in their diameter are smaller than the molding roller 2 and extend with their rotation axes parallel to the rotation axis of the molding roller 2. The filling roller 22 which is at the front in the rotation direction D of the molding roller 2 rotates oppositely to the molding roller 2, whereas the distanced rear filling roller 24 rotates in equal directions to the molding roller 2. The filling rollers 22 and 24 thus rotate such that the mass 8 is pressed or pulled into the free space 25 between the filling rollers 22 and 24 in the direction of the arrow. The mass for example is fed at a temperature $T_1$ which is preferably ≤90° C. At least one of the filling rollers 22, 24, preferably both filling rollers 22, 24 can be heated, in order to keep the mass 8 at the temperature $T_1$ and to prevent the mass 8 from solidifying in the free space 25 before it is brought into the mold cavities 4. The filling rollers 22, 24 are distanced to the molding roller 2 in the radial direction, wherein the distances between the filling rollers 22, 24 and the molding roller 22 which arise by way of this are closed by spacer elements 26. The spacer elements 26 bear on the lateral surface of the molding roller 2 and on the lateral surfaces or surfaces of a filling roller 22, 24. The mass 8 is brought into the mold cavities 4 in the free space 25 between the two spacer elements 26 and is spread away from the lateral surface of the molding roller 2 in the surrounding region of the mold cavities 4 by the spacer elements 26. The spacer elements 26 can also be heated for the temperature control of the mass 8. The fluid or viscous mass is brought into the mold cavities 4 at a temperature $T_1$ and rigidifies or solidifies between the filling region 6 and the removal region 10 during the rotation of the molding roller 2 in the rotation direction D. On removal, the products 12 have a temperature $T_2$ which is already ≤50° C. At this temperature, in particular the outer side of the products 12 has solidified to such an extent that the products 12 are intrinsically stable and lie on the removal belt 14 in an intrinsically stable manner and can be cooled further there. Before the filling of mold cavities 4, the molding roller 2 can be sprayed with a release agent via a spraying device 28, said release agent reducing the adhesion of the mass 8 in the mold cavities 4 and assisting in the removal of the products 12.

FIG. 3 shows a detail enlargement of the filling region 6 of the embodiment example according to FIG. 1. The two spacer elements 26 together form a filling block with an opening 30 in its inside. The mass 8 is fed through the opening 30 out of the free space 25 between the filling rollers 22, 24 to the mold cavities 4 or mold nests 4. The opening 30 in the filling block or between the spacer elements 26 is dimensioned such that the ratio between the length L in the flow direction of the mass 8 to the width B in the rotation direction D of the molding roller 2 is preferably in a ratio L/D between 1/1.25 and 1/0.77.

In the embodiment example according to FIG. 2, the filling region 6 is configured differently than in the embodiment example according to FIG. 1, specifically with only one filling roller 22 and only one spacer element 26 between this filling roller 22 and molding roller 2. The filling roller 22 is arranged displaced somewhat to the bottom in the rotation direction D of the molding roller 2 compared to the first embodiment example, so that a free spec 25 into which the mass 8 is filled arises between the filling roller 22 and the molding roller 2. Here too, the filling roller 22 and possibly the spacer element 26 are temperature controlled, in order to fill in the mass 8 at the defined temperature $T_1$ in fluid or viscous form, wherein the mass 8 subsequently becomes solid in the mold cavities 4 given further rotation of the molding roller 2, before the mold cavities 4 reach the removal region 10.

Alternatively or additionally to the solidification of the mass 8 by way of cooling, the dilution can be effected by a chemically activated gelling process. For this, it is possible to admix a substance which activates or renders possible the gelling procedure, to a base mass at a certain point in time, so that the solidification of the mass 8 is effected in the mold cavities 4 as has been described previously. For this, the free space 25 via which the mass 8 is fed to the mold cavities 4 is preferably connected to a mixing device 32 as is shown in FIG. 4 and is described hereinafter.

FIG. 4 shows a mixing device 32 for providing the mass 8 which is fed to the filling region 6 of the molding machine. For this, the mixing device 32 can be connected to the filling region 6 via a pipe conduit 34. The transfer of the mass 8 however can also be effected in another manner. The mixing device 32 as a central constituent comprises a conduit section 36 which forms a buffer reservoir or a buffer pipe. The conduit section 36 is tubular and at its first axial end comprises an inlet 38 which in this embodiment example is arranged centrally at the axial end of the conduit section 36. A delivery pump 40 which is preferably configured as a metering pump is arranged upstream of the inlet 38. A base mass 42 is conveyed into the conduit section 36 in a continuous manner and in the desired delivery quantity via the delivery pump 40. The base mass 42 can for example be a fruit gum mass which is to say a sugar-based mass which comprises a gelling agent such as pectin.

At its second opposite axial end, the conduit section 36 comprises an outlet 44 which with regard to the longitudinal axis X of the conduit section 36 extends in the radial direction and runs out into the pipe conduit 34. The face side of the conduit section 36 which is situated adjacently to the outlet 44, which is to say the face side which is opposite to the inlet 38 is closed by a wall 46 which centrally comprises a recess 48. An admixing pipe 50 extends through the recess 48 into the inside of the conduit section 36. The admixing pipe 50 is guided in the recess 48 in an axially movable manner, so that it can be moved forwards and backwards along the longitudinal axis X in the direction of the arrow E. Hence the immersing depth into the conduit section 36 can be varied. For this, the admixing pipe 50 is led in the recess 48 in sealed and movable manner by way of a suitable sealing arrangement. At its first axial end which is situated in the inside of the conduit section 36, the admixing pipe 50 comprises a run-out opening 52 which in this case is formed by the open axial end of the admixing pipe. At its opposite axial end which is situated outside the conduit section 36, the admixing pipe 50 is connected to a metering pump 54 which at the inlet side is connected to a feed or to a storage container for a substance 56. The substance 56 for example can be an activator or an acid. The substance 56 can be delivered into the inside of the conduit section 36 via the metering pump 54 and there can be continuously admixed to the base mass 42 which is fed via the delivery pump 40. For this, a stationary mixer 58 is arranged in the inside of the conduit section 36. The mixer 58 comprises a structure of flow-leading elements such as for example webs or ribs, said structure leading to a through-mixing of the mass which flows through the mixer 58. The stationary mixer 58 is fastened to the axial end of the admixing pipe 50 in a manner such that the run-out opening 52 of the admixing pipe 50 runs out into the mixer 58 in a central manner, and specifically at its upstream end. One therefore succeeds in the substance 56 which is fed via the metering pump 54 being mixed with the base mass 42 on flowing through the mixer 58.

A mixing region in which the mixing of the substance 56 with the base mass 42 is effected is therefore created in the mixer 58. Due to the fact that the mixer is fastened to the admixing pipe 50, it can be displaced together with the admixing pipe 50 in the conduit section 36 in the axial direction X, by which means the complete mixing region is displaced axially in the conduit section 36. By way of this, the dwell time of the mixed mass downstream of the mixer 58 can be changed. If the mixing region is displaced in the direction of the arrow $E_1$ closer to the outlet 44, then the path between the mixer 58 and the outlet 44 shortens so that the conveying path for the mixed mass to the outlet 44 and herewith also to the filling region 6 is shortened. Given a constant flow speed which is defined by the delivery pump 40, the mixed mass hence reaches the filling region 6 more quickly. The conveying path can thus be adapted in order given a shorter gelling time of the recipe to shorten the conveying path of the mixed mass 8 such that the point in time of gelling is set such that the mass is brought into the mold cavities 4 in an adequately viscous state and not until there does it gel to such an extent that shape stability is reached. If in contrast a recipe is processed, concerning which the gelling takes more time after the mixing of the base substance 42 and the fed substance 56, then the mixer 58 can be distanced further from the outlet 44 in the direction of the arrow $E_2$, so that the conveying path for the mixed mass up to the filling region 6 is extended and hence more time remains for the gelling procedure up the entry into the mold cavities 4.

Furthermore, an adaptation to different flow speeds is also possible, if for example a molding roller 2 with smaller or fewer mold cavities 4 is applied, then less mass 8 per unit of time needs to the fed to the molding roller 2. Since the conduit cross sections in the mixing device 32 however are constant, this requires a lower flow speed. In such a case, by way of displacing the mixer 58 in the arrow direction $E_1$, the conveying path can be shortened to such an extent that the time duration from the mixing in the mixer 58 up to the entry into the mold cavities 4 is essentially not extended, so that the gelling in the mold cavities continues to set in to the desired extent.

In this embodiment example, a sieve 60 is arranged in the outlet 44, said sieve serving to break up possible lumps by way of these being pressed through the sieve 60 with the flowing mass. Such lumps for example can occur if a premature gelling of parts of the mass 8 occurs already in the region of the mixer 58.

A manual adjustability can be provided for the positioning and for the axial adjustment of the admixing pipe 50 and the mixer 58, for which adjustability for example a suitable clamping device can be arranged at the recess 48 and possibly a suitable scale for displaying the penetration depth can be arranged on the admixing pipe 50. Alternatively however, an automated positioning can also be provided by way of the admixing pipe 50 being moved forwards and backwards via a suitable drive device, for example an electrical or pneumatic servo drive. This permits a positioning of the admixing pipe 50 via a facility control which herewith can set the axial position of the mixing region in dependence on the recipe and applied molding roller 2 in an automated manner.

While specific embodiments of the invention have been shown and described in detail to illustrate the application of the principles of the invention, it will be understood that the invention may be embodied otherwise without departing from such principles.

LIST OF REFERENCE CHARACTERS 2 molding roller
4 mold cavities
6 filling region
8 mass
10 removal region
12 product
14 removal belt
16 rollers
18 cooling device
20 cooling tunnel
22, 24 filling rollers
25 free space
26 spacer elements, filling block
28 spraying device
30 inlet
32 mixing device
34 pipe conduit
36 conduit section
38 entry
40 delivery pump
42 base mass
44 outlet 46 wall
48 recess
50 admixing pipe
52 run-out opening
54 metering pump
56 substance
58 mixer
60 sieve
A conveying direction
D rotation direction
L length
B width
X longitudinal axis
E, $E_1$, $E_2$ movement directions of the admixing pipe

What is claimed is:

1. A mixing device for a continuous provision of a gelling mass for a molding machine, the mixing device comprising:
   an inlet;
   an outlet;
   at least one admixing conduit; and
   a conduit section situated between the inlet and the outlet and into which the at least one admixing conduit runs out, via which admixing conduit a substance to be admixed is fed such that the substance to be admixed is mixed with a base mass which is fed through the inlet, in a mixing region in the conduit section,
   wherein the mixing device is configured such that a spatial distance between the outlet and the mixing region, in which the substance to be admixed is mixed with the base mass is changeable.

2. A mixing device according to claim 1, wherein the at least one admixing conduit comprises several run-out openings which are distanced to the outlet to a different extent and comprise individual shut-off devices.

3. A mixing device according to claim 1, wherein the at least one admixing conduit comprises at least one run-out opening having a position relative to the outlet that is changeable.

4. A mixing device according to claim 1, wherein the at least one admixing conduit comprises at least one run-out opening that is connected to a setting device, via which the distance between the at least one run-out opening and the outlet is changeable.

5. A mixing device according to claim 4, wherein the setting device comprises a servo drive.

6. A mixing device according to claim 1, wherein the mixing device in the conduit section comprises a stationary mixer in which the at least one admixing conduit runs out and which has a position relative to the outlet that is changeable.

7. A mixing device according to claim 1, wherein the admixing conduit is configured as an admixing pipe which extends through a recess in a wall of the conduit section and is axially displaceable in the recess in a direction of an admixing pipe longitudinal axis.

8. A mixing device according to claim 7, wherein the admixing pipe longitudinal axis extends in a direction of a flow direction which is defined by the inlet and the outlet.

9. A mixing device according to claim 1, further comprising at least one delivery pump for conveying a base mass, the at least one delivery pump being arranged upstream of the inlet.

10. A molding machine for manufacturing shape-stable products from a moldable and gellable mass, the molding machine comprising a mixing device comprising:
    an inlet;
    an outlet;
    at least one admixing conduit; and
    a conduit section situated between the inlet and the outlet and into which the at least one admixing conduit runs out, via which admixing conduit a substance to be admixed is fed such that the substance to be admixed is mixed with a base mass which is fed through the inlet, in a mixing region in the conduit section,
    wherein the mixing device is configured such that a spatial distance between the outlet and the mixing region, in which the substance to be admixed is mixed with the base mass is changeable, and
    wherein the mixing device is configured to provide the moldable mass.

11. A molding machine according to claim 10, further comprising a rotatingly driven molding roller having lateral surface mold cavities, wherein the outlet of the mixing device is connected to a filling device of the molding roller.

12. A molding machine configured for manufacturing shape-stable products from a mass with a viscosity in the range of 10000 to 80000 mPas, the molding machine comprising:
    a mixing device comprising: an inlet; an outlet; at least one admixing conduit; and a conduit section situated between the inlet and the outlet and into which the at least one admixing conduit runs out, via which admixing conduit a substance to be admixed is fed such that the substance to be admixed is mixed with a base mass which is fed through the inlet, in a mixing region in the conduit section, wherein the mixing device is configured such that a spatial distance between the outlet and the mixing region, in which the substance to be admixed is mixed with the base mass is changeable;
    a rotatingly driven molding roller having lateral surface mold cavities;
    at least one filling roller which is arranged distanced to the molding roller, is driven rotatingly and is heated and which has a rotation axis that extends parallel to a rotation axis of the molding roller;
    a spacer element which is arranged between the filling roller and the molding roller and which is in contact with the lateral surface of the filling roller and the lateral surface of the molding roller; and
    a removal belt which encompasses the molding roller in a peripheral region and extends away from the molding roller in a removal region.

13. A method for processing a flowable and gellable mass, the method comprising the steps of:
    continuously admixing a substance, which activates a gelling process, to a base mass which flows in a feed conduit, wherein the substance is admixed to the base mass in at least one mixing region which is situated in the feed conduit; and
    setting a dwell duration of the base mass with the admixed substance downstream of the mixing region by changing a position of the mixing region.

14. A method according to claim 13, wherein the base mass which is mixed with the substance is molded in at least one mold and after at least partially effected gelling is removed from the mold, wherein a time interval between the admixing of the substance to the base mass and bringing the mass into the at least one mold is set by a change of a distance of the mixing region from the mold, said distance being given by the flow direction.

15. A method according to claim 13, wherein the base mass comprises a gelling agent and the admixed substance comprises an activator.

16. A method, in particular according to claim 13, wherein shape-stable products are manufactured from a mass with a viscosity in the range of 10000 to 80000 mPas, with the following steps:
- providing a flowable mass with a viscosity in the range of 10000 to 80000 mPas;
- bringing the flowable mass into mold cavities of a rotating molding roller;
- hardening the mass within the mold cavities during the rotation of the molding roller, wherein the mass solidifies such that the solidified mass is removable from the mold cavities; and
- removing the products which are formed from the solidified mass, out of the mold cavities.

17. A method according to claim 13, wherein the gelling agent comprises a pectin.

18. A method according to claim 13, wherein the activator comprises an acid.

* * * * *